(12) United States Patent
Hoof van

(10) Patent No.: US 9,568,809 B2
(45) Date of Patent: Feb. 14, 2017

(54) ADJUSTMENT ARRANGEMENT

(75) Inventor: Berry Hoof van, Helmond (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/354,728

(22) PCT Filed: Oct. 27, 2011

(86) PCT No.: PCT/EP2011/068846
§ 371 (c)(1),
(2), (4) Date: Sep. 22, 2014

(87) PCT Pub. No.: WO2013/060369
PCT Pub. Date: May 2, 2013

(65) Prior Publication Data
US 2015/0023655 A1    Jan. 22, 2015

(51) Int. Cl.
*G03B 17/56* (2006.01)
*G03B 17/02* (2006.01)
*F16M 11/08* (2006.01)
*G08B 13/196* (2006.01)

(52) U.S. Cl.
CPC ............ *G03B 17/561* (2013.01); *F16M 11/08* (2013.01); *G03B 17/02* (2013.01); *G08B 13/19619* (2013.01)

(58) Field of Classification Search
USPC ............... 396/427; 248/299.12, 292.13
See application file for complete search history.

(56) References Cited

U.S. PATENT DOCUMENTS

| | | | | |
|---|---|---|---|---|
| 4,648,654 A | * | 3/1987 | Voss | 297/313 |
| 5,289,091 A | * | 2/1994 | Wada | H04N 7/183 |
| | | | | 318/282 |
| 5,492,296 A | * | 2/1996 | Biber | 248/292.13 |
| 2006/0261248 A1 | | 11/2006 | Hwang | |
| 2010/0245569 A1 | * | 9/2010 | Hakoishi | 348/143 |

FOREIGN PATENT DOCUMENTS

| | | |
|---|---|---|
| CN | 1139538 | 1/1997 |
| CN | 201696840 | 1/2011 |
| EP | 0931972 | 7/1999 |
| EP | 1729269 | 12/2006 |
| JP | 2008-514978 | 5/2008 |
| WO | 9535624 | 12/1995 |

OTHER PUBLICATIONS

International Search Report for Application No. PCT/EP2011/068846 dated Jul. 25, 2012 (2 pages).

* cited by examiner

*Primary Examiner* — Clayton E Laballe
*Assistant Examiner* — Dennis Hancock
(74) *Attorney, Agent, or Firm* — Michael Best & Friedrich LLP

(57) ABSTRACT

The invention provides for an adjustment arrangement (10) for a camera. The adjustment arrangement (10) comprises a turn plate (20), an upper turn plate (18), a stick (12) and a gearwheel (14).

22 Claims, 8 Drawing Sheets

ADJUSTMENT ARRANGEMENT

BACKGROUND OF THE INVENTION

The invention provides for an adjustment arrangement for a camera, especially a camera enclosed by a housing, e.g. a dome camera. Particularly, the adjustment arrangement is suitable for horizontally adjusting the optical train of a camera. This camera can be mounted to a wall or ceiling or even to an inclined plane.

Furthermore, the invention provides for a camera arrangement comprising such an adjustment arrangement.

Adjustment arrangements for a camera are used for firmly mounting the camera to a plane, e.g. a wall or a ceiling. The adjustment arrangement used should be able to allow for adjusting the camera after installation. This is particularly important for a camera enclosed by a housing, e.g. a dome camera.

A dome camera is a monitoring camera used in a protective system. Usually, the dome camera is incorporated within a hemispherical shaded dome made of plastics. Said dome is provided for protecting the camera against damage and vandalism.

Dome cameras have been used at flashpoints as well as in public means of transport both interior and exterior. A main advantage of such a dome camera is that it is not possible to determine the orientation of the camera hidden by the shaded dome.

Document EP 1 729 269 A1 discloses a dome with optical correction for use in a vandal proof surveillance camera system. The dome comprises a transparent optical material, which itself comprises an inner surface and an outer surface. Both surfaces are essentially rotational symmetrical and exhibit non-spherical shapes. Said dome is used in a vandal-proof surveillance camera system comprising said dome and a camera being pivotably mounted inside the dome.

It is to be noted that optical train is also referred to as optical assembly and is the arrangement of lenses to guide the line of sight. The position and angle of lenses are adjusted to guide the line of sight through the path required.

A main problem in dome cameras is that it is difficult to be able to adjust the horizontal "tilt" after or during installation of the camera. When the camera is mounted to a wall or ceiling or even under an inclined or angular surface, the horizontal adjustment corrects the horizontal tilt angle (angle of view) of the complete optical train in the camera by simply pushing and rotating the sprocket stick, which will drive a gearwheel to set or correct the angle.

SUMMARY OF THE INVENTION

The invention provides for an adjustment arrangement and a camera arrangement.

The construction withholds the complete optical train such as the MBF-lens assembly, suspension of this assembly to the inside of the sphere where it also has a damping character during impact.

The horizontal adjustment assembly, as an embodiment of the adjustment arrangement according to the invention, comprises a turn plate, an upper turn plate, a gearwheel and a sprocket stick, which can be spring loaded to guarantee the lock position. In that case the stick or sprocket stick can be locked by the spring. The spring load has to be overcome to unlock the stick.

The foregoing summary as well as the following detailed description of preferred embodiments of the invention will be better understood when read in conjunction with the appended drawings. For the purpose of illustrating the invention, embodiments of the invention are shown in the drawings. It should be understood however, that the invention is not limited to precise arrangements and instrumentalities shown.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

The invention will be described in more details with reference to the drawings given below, in which.

DETAILED DESCRIPTION

Figure 1:
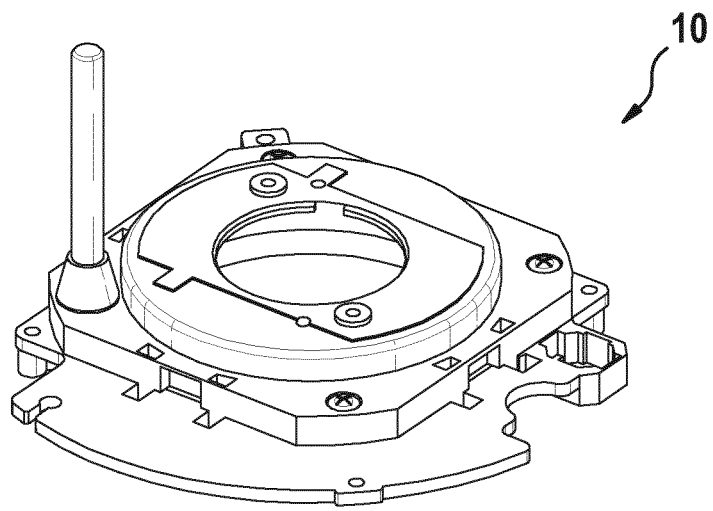
FIG. 1 shows a first embodiment of the adjustment arrangement for a camera according to the invention in top view.

FIG. 1 shows an assembled horizontal adjustment arrangement in top view which is annoted overall with reference number 10. This adjustment arrangement 10 is used for mounting a camera, especially a dome camera, to a wall or ceiling and allows for adjusting the camera in horizontal direction after installation.

Figure 2:
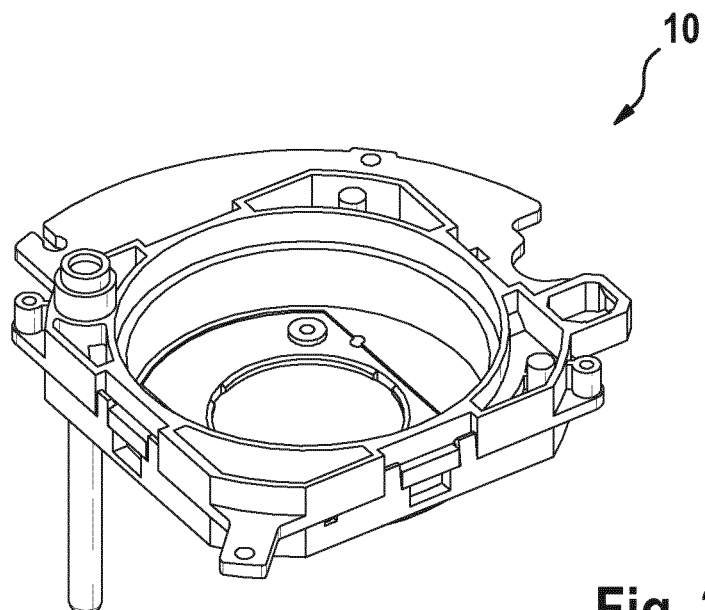
FIG. 2 shows the adjustment arrangement of FIG. 1 in bottom view.

FIG. 2 shows the horizontal adjustment arrangement 10 in bottom view.

Figure 3:
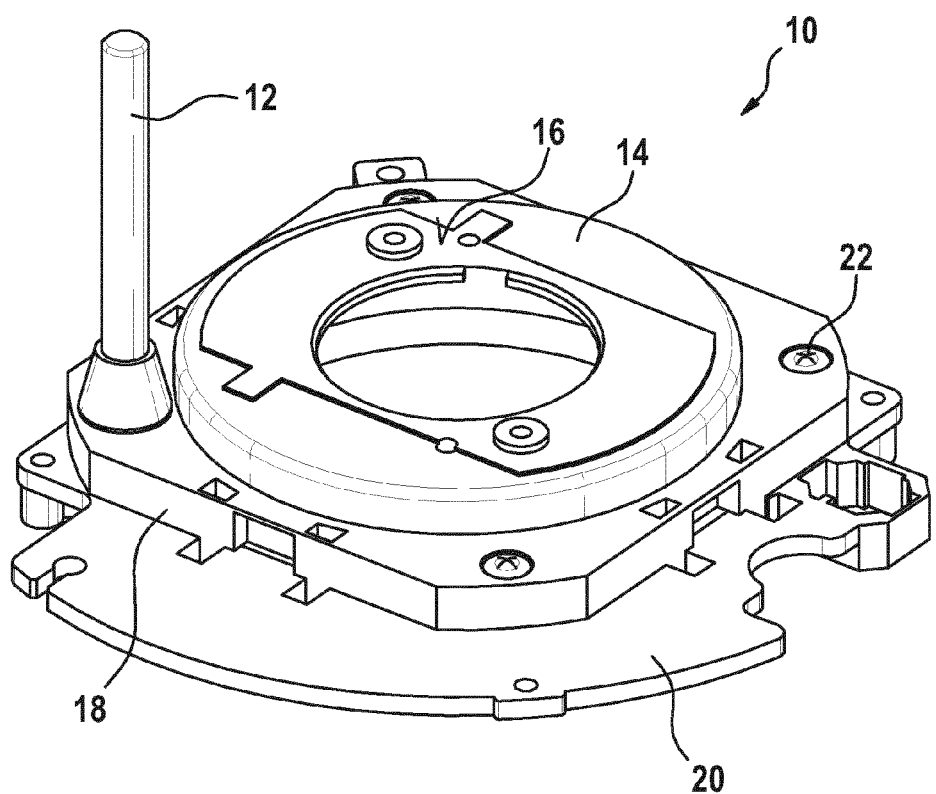
FIG. 3 shows the adjustment arrangement of FIG. 1 in more detail and in top view.

FIG. 3 shows the horizontal adjustment arrangement 10 in top view. The horizontal adjustment arrangement 10 comprises a stick 12, in this embodiment a sprocket stick, which is spring-loaded for locking, a gearwheel 14 having a market surface 16 to connect the MBF (motorised back focus) and lens, an upper turn plate 18 and a turn plate 20 for centering and holding the gearwheel 14. The upper turn plate 18 is mounted by screws 22 to the turn plate 20.

Figure 4:
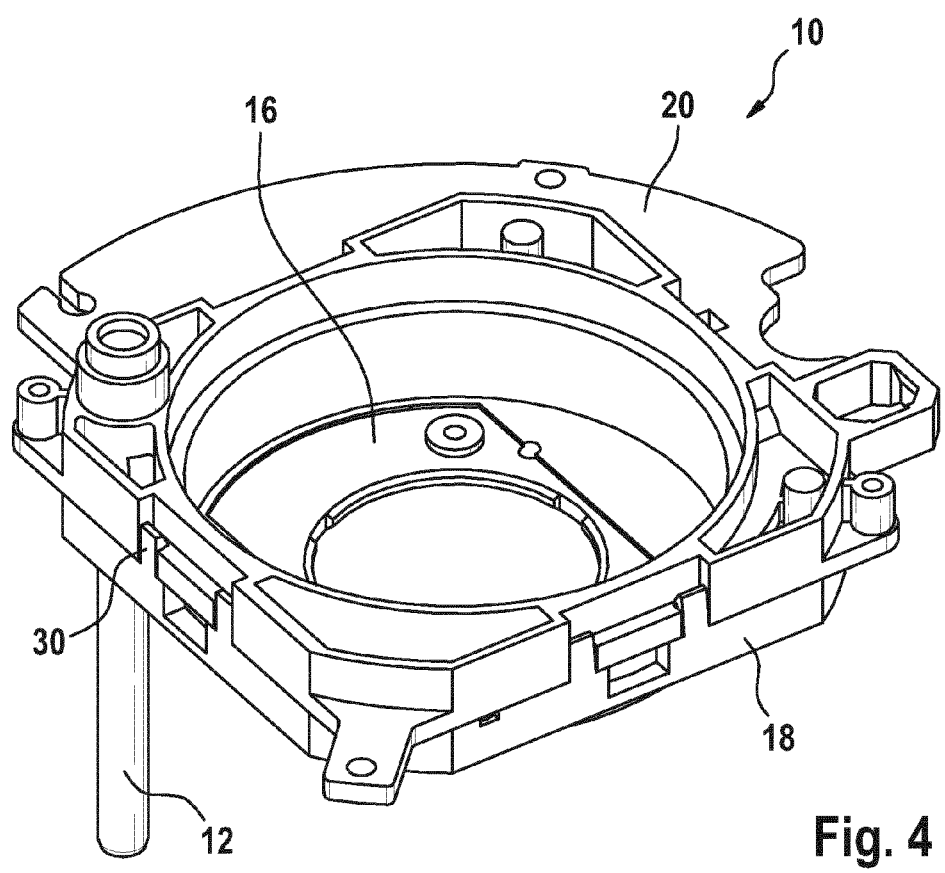
FIG. 4 shows the adjustment arrangement of FIG. 3 in bottom view.

FIG. 4 shows the assembled horizontal adjustment arrangement 10 of FIG. 3 in bottom view. Furthermore, the drawing shows click-fingers 30 for easy-assembling the adjustment arrangement 10, especially for mounting the upper turn plate 18 to the turn plate 20.

Figure 5:
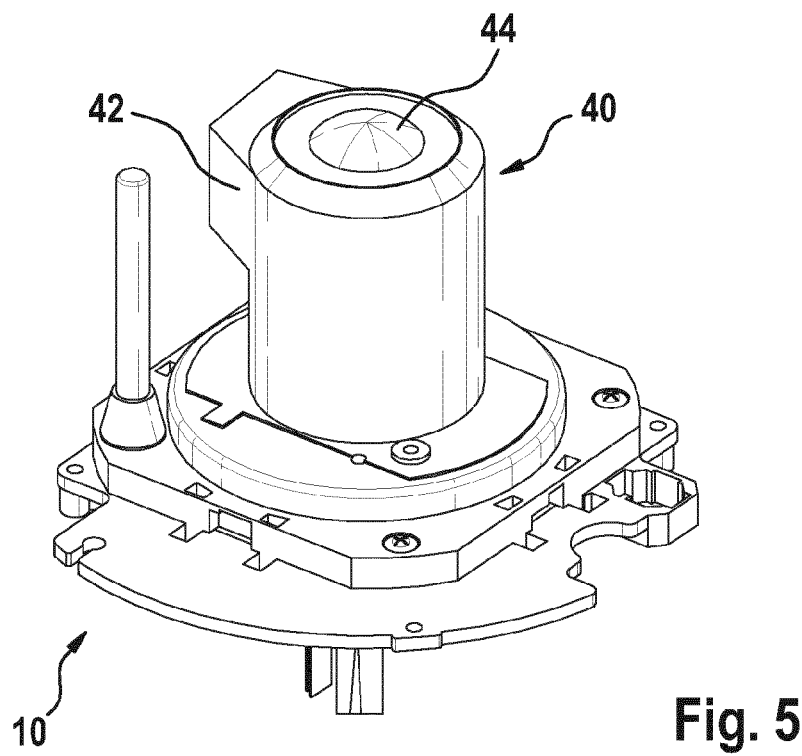
FIG. 5 shows the adjustment arrangement of FIG. 1 connected to a dome camera in top view.

FIG. 5 shows the adjustment arrangement 10 connected to a camera 40 enclosed by a housing 42 in top view. The drawing shows the housing 42 enclosing the camera 40 and comprising a window 44.

Figure 6:
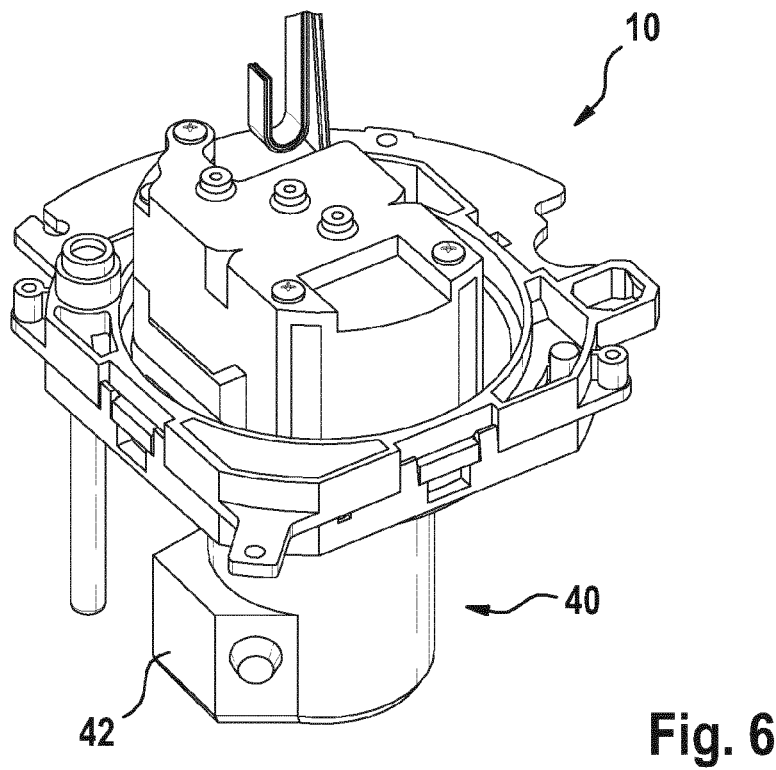
FIG. 6 shows the adjustment arrangement connected to the dome camera of FIG. 5 in bottom view.

FIG. 6 shows the adjustment arrangement 10 connected to the enclosed camera 40 in bottom view.

Figure 7:
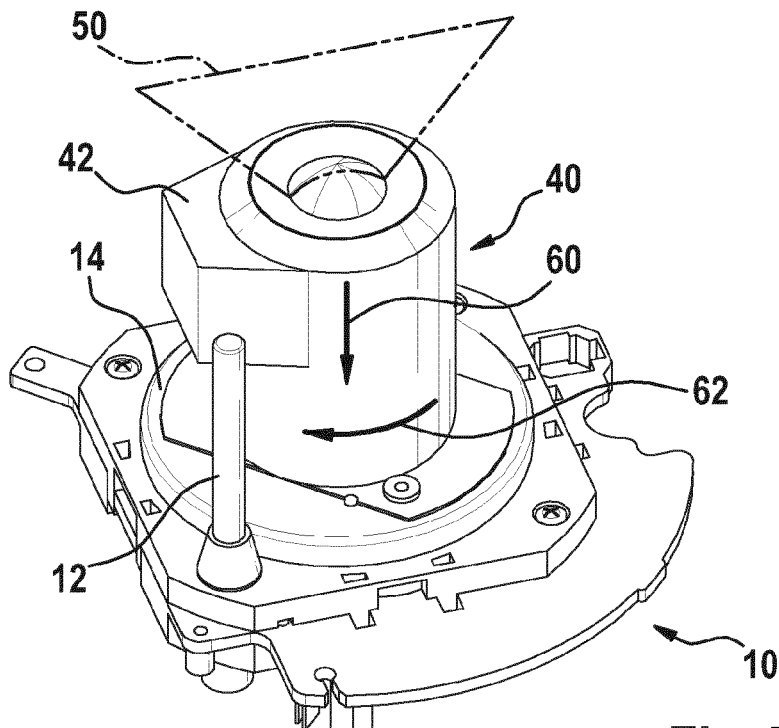
FIGS. 7 to 9 show the adjustment arrangement connected to the dome camera according to FIG. 6 for illustrating the functionality.
Figure 8:
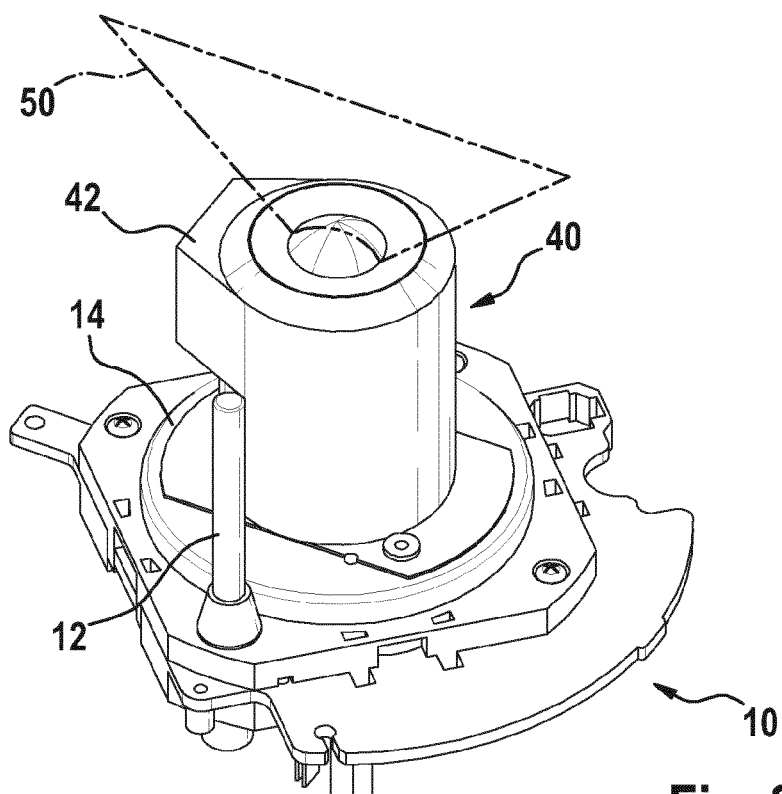
Figure 9:
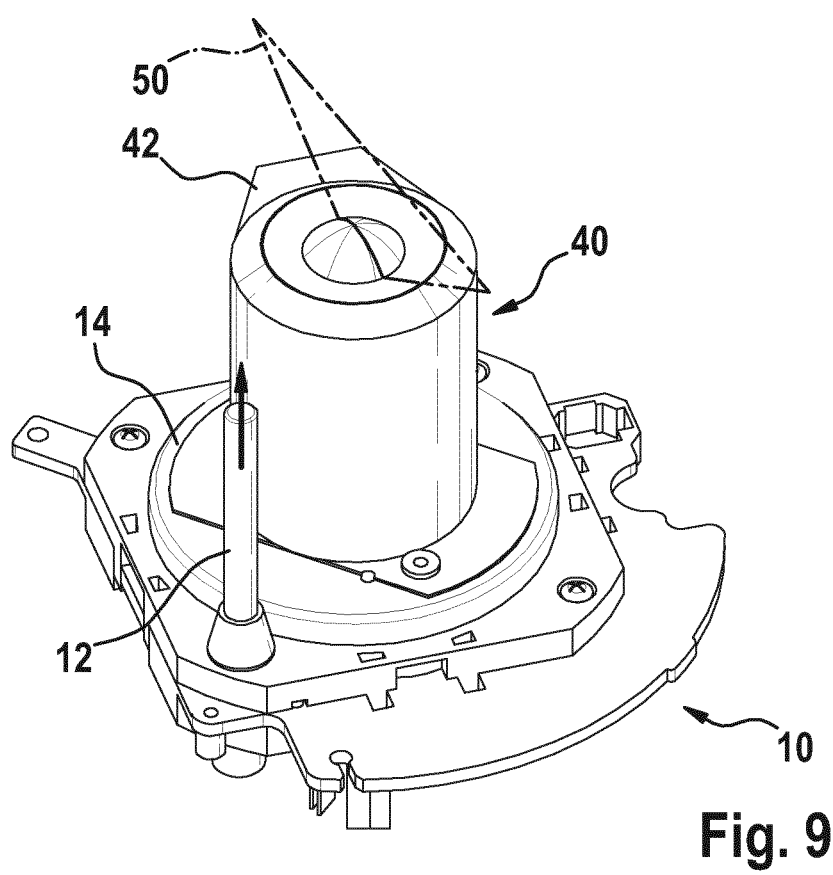

FIGS. 7 to 9 show the adjustment arrangement 10 connected to the enclosed camera 40 in bottom view. A triangle 50 illustrates the lens orientation of the enclosed camera 40 and therefore the line of sight or lens-view, respectively of the enclosed camera 40.

For adjusting the horizontal tilt of the camera 40 the sprocket stick 12 is pushed in direction of arrow 60 and turned. The complete optical train comprising the lens, the gearwheel 14 and the MBF is turned as shown by arrow 62. The gearwheel 14 (FIG. 7) can be rotated to a desired angle as long as the sprocket stick 12 is driven. Once the horizontal plane of the triangle 52 is in the required position, the sprocket stick 12 is released. Henceforth, the horizontal adjustment is set in a new locked position.

Figure 10:
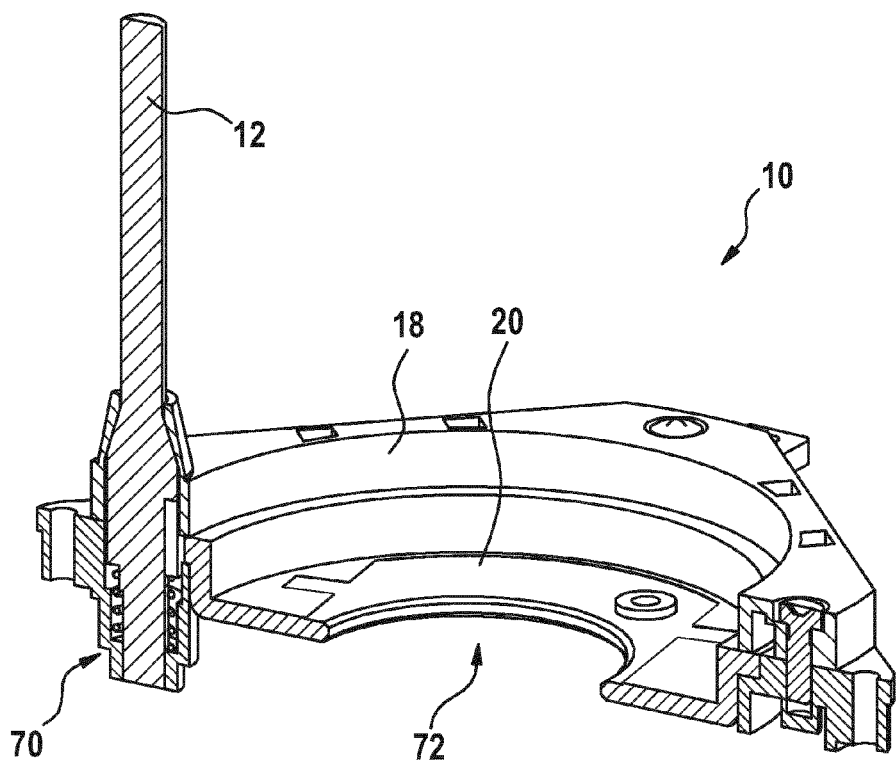
FIG. 10 shows a section of the adjustment arrangement of FIG. 4 in a first operating condition.

FIG. 10 shows a section of the adjustment arrangement 10 comprising the turnplate 20, the upper turn plate 18 and the sprocket stick 12. The sprocket stick 12 is loaded by a spring 70. Arrow 72 indicates position of the gearwheel (not shown).

The sprocket stick 12 shown is in a static position and locked in its "splines" by pressure of the spring 70 and will be blocking the teeth of the gearwheel. This secures the rotation block of the gearwheel.

Figure 11:
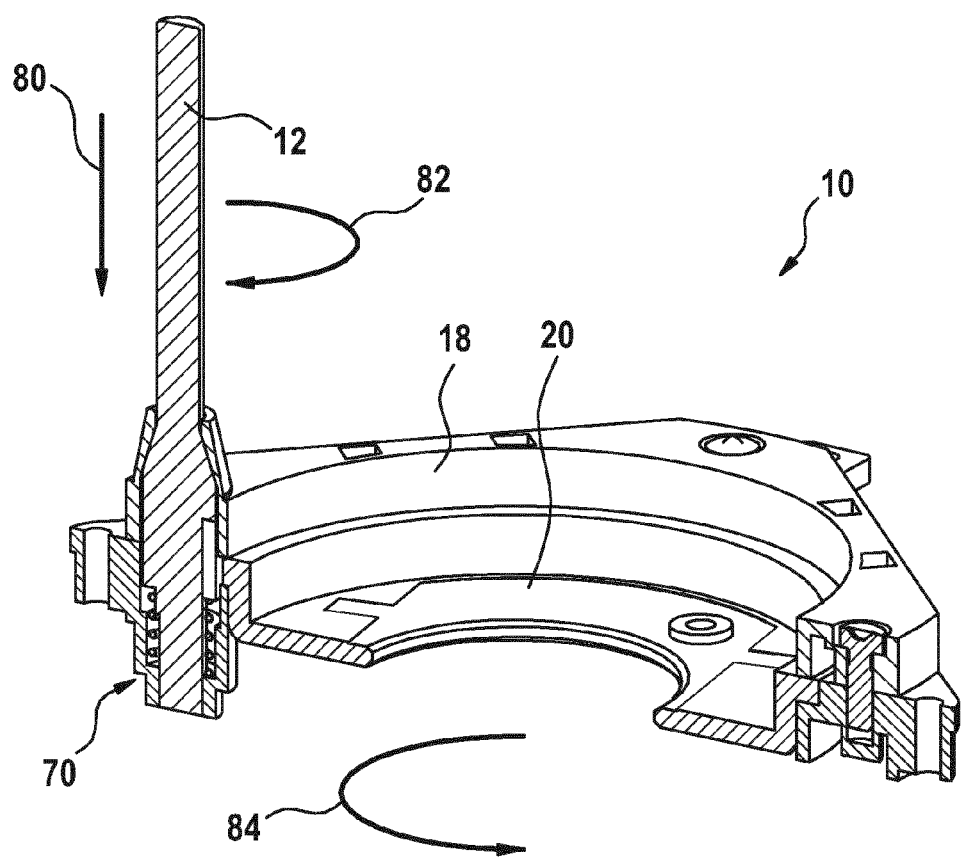
FIG. 11 shows the section of the adjustment arrangement of FIG. 10 in a second operating condition.

FIG. 11 illustrates the functional principle of the adjustment arrangement 10. By pushing the sprocket stick 12 downwards in direction of arrow 80 against the spring load will cause the splines to be unlocked. Therefore, the sprocket stick 12 can be turned (arrow 82) to drive the gearwheel. The gearwheel will be unlocked and turned in direction of arrow 84.

The sprocket stick 12 can be made of molded POM, the upper turn plate 18 can be made of molded PC-ABS. Molded PC-ABS can be used for the turn plate 20, Molded POM can be used for building the gearwheel.

For turning the gearwheel the sprocket stick 12 is in contact to the circumference of the gearwheel, in this manner rotation of the sprocket stick 12 is transferred to the gearwheel. In one embodiment the sprocket is provided with teeth meshing with teeth of the gearwheel.

Different methods for transfering rotation of the stick to the gearwheel are possible according to the invention, e.g. a chain, a belt cord and sprocket and teeth meshing. In case rotation is transferred by meshing teeth, the stick is built as a sprocket stick. In case the rotation is transferred by a chain or a cord belt, the stick can be built as a sprocket stick. However, in that case the stick does not have to be built as a sprocket stick.

What is claimed is:

1. An adjustment arrangement for a camera (40), the adjustment arrangement comprising a stick (12) having a longitudinal axis and a gearwheel (14) having an axis of rotation and lying in a plane perpendicular to the axis of rotation, and the gearwheel (14) being configured to support the camera (40) and being rotatable to adjust the camera (40) by rotating the stick (12) about the longitudinal axis, wherein the longitudinal axis is perpendicular to the plane and is spaced from the axis of rotation, wherein the stick (12) has an extended position and a pushed-in position and is rotatably lockable, and wherein rotation of the gearwheel (14) adjusts a position of the camera (40).

2. The adjustment arrangement according to claim 1, wherein the stick (12) is a sprocket stick.

3. The adjustment arrangement according to claim 1, wherein rotation of the gearwheel (14) adjusts a tilt of the camera (40).

4. The adjustment arrangement according to claim 1, wherein the adjustment arrangement comprises a first turn plate (20) and a second turn plate (18).

5. The adjustment arrangement according to claim 4, wherein the second turn plate (18) is mounted on the first turn plate (20) by means of screws (22).

6. The adjustment arrangement according to claim 4, wherein the second turn plate (18) is mounted on the second turn plate (20) by means of click-fingers (30).

7. The adjustment arrangement according to claim 4, wherein the stick extends away from the second turn plate in a direction, and wherein the adjustment arrangement is configured such that the camera (40) extends away from the gearwheel in the direction.

8. The adjustment arrangement according to claim 7, wherein in the extended position the stick is fully extended from the second plate in the direction and is rotatably locked, wherein in the pushed-in position the stick is not fully extended from the second plate and is not rotatably locked such that the stick can be rotated to rotate the gearwheel, and wherein the stick (12) is loaded by a spring (70) which biases the stick (12) towards the extended position, the spring having a load to be overcome to move the stick (12) to the pushed-in position.

9. The adjustment arrangement according to claim 8, wherein the stick (12) is arranged to be moved from the extended position to the pushed-in position by pushing an end of the stick (12).

10. The adjustment arrangement according to claim 8, wherein rotation of the stick (12) is transferred to the gearwheel (14) by contact.

11. The adjustment arrangement according to claim 8, wherein rotation of the stick (12) is transferred to the gearwheel (14) by meshing teeth.

12. A camera arrangement comprising a stick (12) having a longitudinal axis and a camera (40) mounted on a gearwheel (14) having an axis of rotation, the gearwheel (14) lying in a plane perpendicular to the axis of rotation and being rotatable to adjust the camera (40) by rotating the stick (12) about the longitudinal axis, wherein the longitudinal axis is perpendicular to the plane and is spaced from the axis of rotation, wherein the stick (12) has an extended position and a pushed-in position and is rotatably lockable, and wherein rotation of the gearwheel (14) adjusts a position of the camera (40).

13. The camera arrangement according to claim 12, wherein the stick (12) is a sprocket stick.

14. The camera according to claim 12, wherein rotation of the gearwheel (14) adjusts a tilt of the camera (40).

15. The camera arrangement according to claim 12, wherein the camera arrangement comprises a first turn plate (20) and a second turn plate (18).

16. The camera arrangement according to claim 15, wherein the second turn plate (18) is mounted on the first turn plate (20) by means of screws (22).

17. The camera arrangement according to claim 15, wherein the second turn plate (18) is mounted on the second turn plate (20) by means of click-fingers (30).

18. The camera arrangement according to claim 15, wherein the stick extends away from the second turn plate in a direction, and wherein the camera (40) extends away from the gearwheel in the direction.

19. The camera arrangement according to claim 18, wherein in the extended position the stick is fully extended from the second plate in the direction and is rotatably locked, wherein in the pushed-in position the stick is not fully extended from the second plate and is not rotatably locked such that the stick can be rotated to rotate the gearwheel, and wherein the stick (12) is loaded by a spring (70) which biases the stick (12) towards the extended position, the spring having a load to be overcome to move the stick (12) to the pushed-in position.

20. The camera arrangement according to claim 19, wherein the stick (12) is arranged to be moved from the extended position to the pushed-in position by pushing an end of the stick (12).

21. The camera arrangement according to claim 19, wherein rotation of the stick (12) is transferred to the gearwheel (14) by contact.

22. The camera arrangement according to claim 19, wherein rotation of the stick (12) is transferred to the gearwheel (14) by meshing teeth.

* * * * *